(12) United States Patent
Datta

(10) Patent No.: US 6,913,265 B2
(45) Date of Patent: Jul. 5, 2005

(54) BRUSH SEAL ASSEMBLY, METHOD OF MANUFACTURE AND USE

(75) Inventor: Amitava Datta, East Greenwich, RI (US)

(73) Assignee: Advanced Components & Materials, Inc., East Greenwich, CT (US)

(*) Notice: Subject to any disclaimer, the term of this patent is extended or adjusted under 35 U.S.C. 154(b) by 0 days.

(21) Appl. No.: 10/394,730

(22) Filed: Mar. 21, 2003

(65) Prior Publication Data

US 2004/0119237 A1 Jun. 24, 2004

Related U.S. Application Data

(63) Continuation-in-part of application No. 09/638,967, filed on Aug. 15, 2000, now abandoned.
(60) Provisional application No. 60/223,886, filed on Aug. 9, 2000.

(51) Int. Cl.⁷ .............................................. F16J 15/447
(52) U.S. Cl. ...................................................... 277/355
(58) Field of Search ........................................ 277/355

(56) References Cited

U.S. PATENT DOCUMENTS

| | | | | |
|---|---|---|---|---|
| 885,032 | A | * 4/1908 | De Ferranti | 415/173.6 |
| 2,878,048 | A | 3/1959 | Peterson | |
| RE30,206 | E | * 2/1980 | Ferguson et al. | 415/173.7 |
| 4,281,838 | A | 8/1981 | Persson | |
| 4,358,120 | A | 11/1982 | Moore | |
| 4,781,388 | A | 11/1988 | Wohrl et al. | |
| 5,066,024 | A | 11/1991 | Reisinger et al. | |
| 5,090,710 | A | 2/1992 | Flower | |
| 5,165,758 | A | 11/1992 | Howe | |
| 5,183,197 | A | 2/1993 | Howe | |
| 5,316,318 | A | 5/1994 | Veau | |
| 5,474,305 | A | 12/1995 | Flower | |
| 5,480,165 | A | * 1/1996 | Flower | 277/355 |
| 5,556,172 | A | 9/1996 | Howe | |
| 5,678,898 | A | * 10/1997 | Bagepalli et al. | 300/21 |
| 5,758,879 | A | * 6/1998 | Flower | 277/303 |
| 5,794,938 | A | * 8/1998 | Hofner et al. | 277/355 |
| 5,799,952 | A | 9/1998 | Morrison et al. | |
| 6,027,121 | A | 2/2000 | Cromer et al. | |
| 6,109,616 | A | 8/2000 | Mayr | |
| 6,120,622 | A | 9/2000 | Mayr et al. | |
| 6,293,553 | B1 | 9/2001 | Werner et al. | |
| 6,302,400 | B1 | * 10/2001 | Werner et al. | 277/355 |
| 6,471,213 | B1 | * 10/2002 | Yuri et al. | 277/355 |

FOREIGN PATENT DOCUMENTS

| | | |
|---|---|---|
| EP | 0 293 140 | 11/1988 |
| EP | 0 866 248 | 9/1998 |
| EP | 0 961 058 A2 | 12/1999 |
| FR | 379 209 | 10/1907 |
| GB | 2 066 382 | 7/1981 |
| GB | 2325965 A | * 12/1998 |
| JP | 2000-120878 | * 4/2000 |
| WO | WO 98/53230 | 11/1998 |
| WO | WO 99/06673 | 2/1999 |

OTHER PUBLICATIONS

J. Short, A. Datta, J. Derby, R. England, R. Johnson, R. Loewenthal, B. Prior, P. Basu, "Brush Seal Development Program," Defense Information Systems Agency, Defense Technical Information Center, Fort Belvoir, Virginia, (cover, pp. 1, 25 and 26).

* cited by examiner

*Primary Examiner*—Alison K. Pickard
(74) *Attorney, Agent, or Firm*—Bowditch & Dewey, LLP

(57) ABSTRACT

A brush seal assembly including a bristle strip having a plurality of bristles mounted at an angle to at least one rail, and an annular holder for supporting the bristle strip is provided. In one embodiment, the bristle strip is flexible such that the strip can be readily bent by hand and the annular holder is preferably U-shaped. The brush seal assembly may be utilized with conventional mounting techniques, and may be mounted within a unitary or segmented holder. Once installed, the brush seal assembly acts as a static and dynamic seal in order to seal the gap between a high pressure source and a low pressure source.

25 Claims, 13 Drawing Sheets

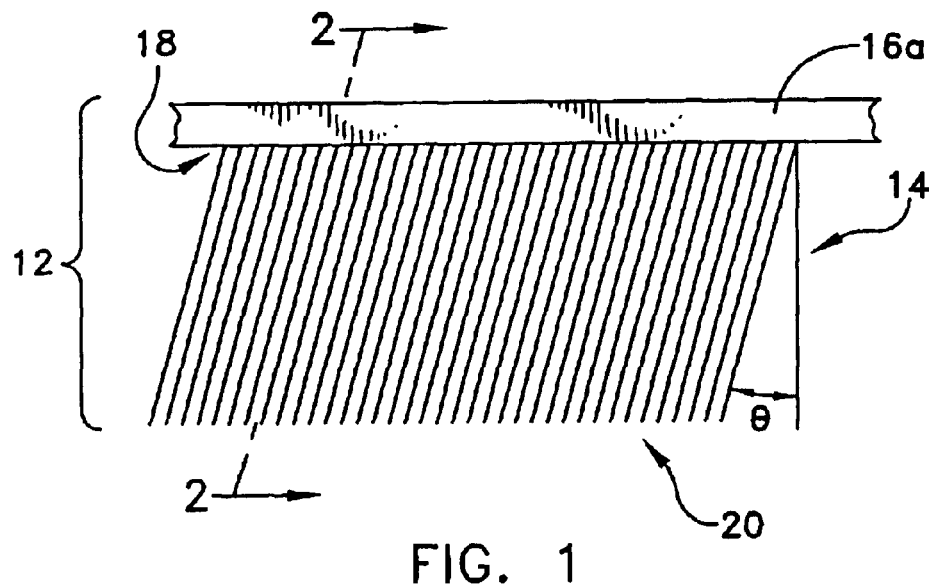
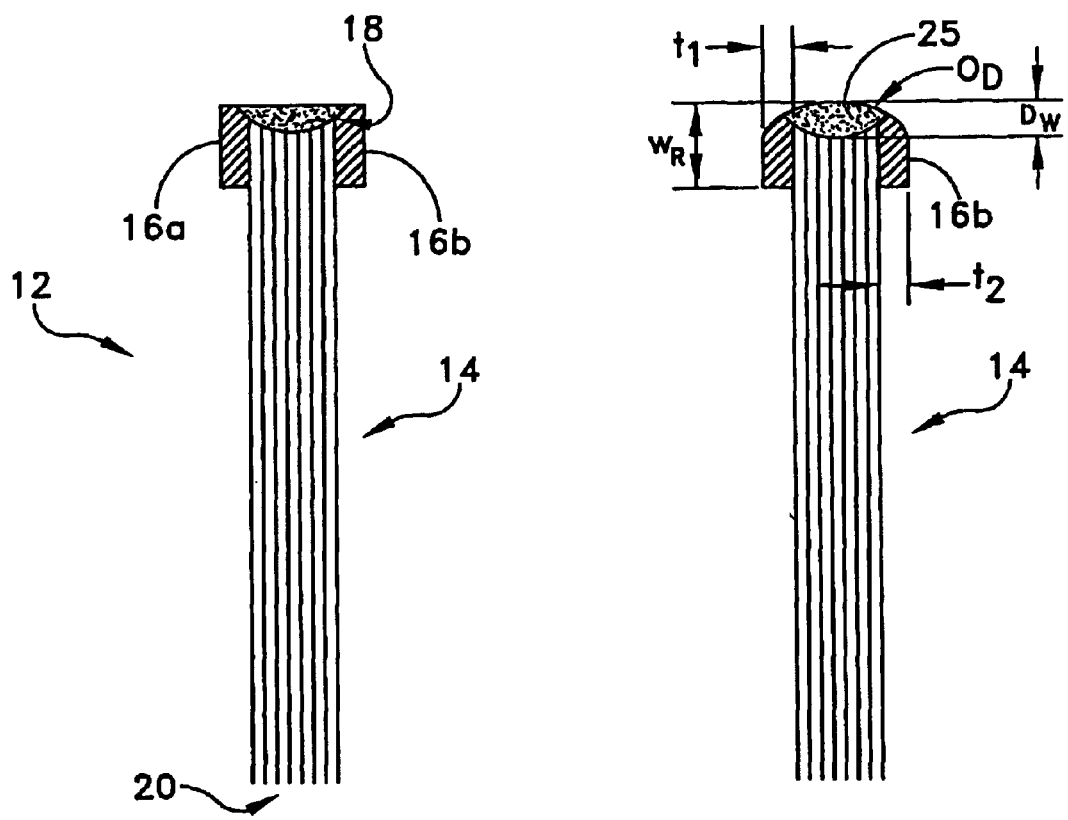
FIG. 1
FIG. 2
FIG. 3a

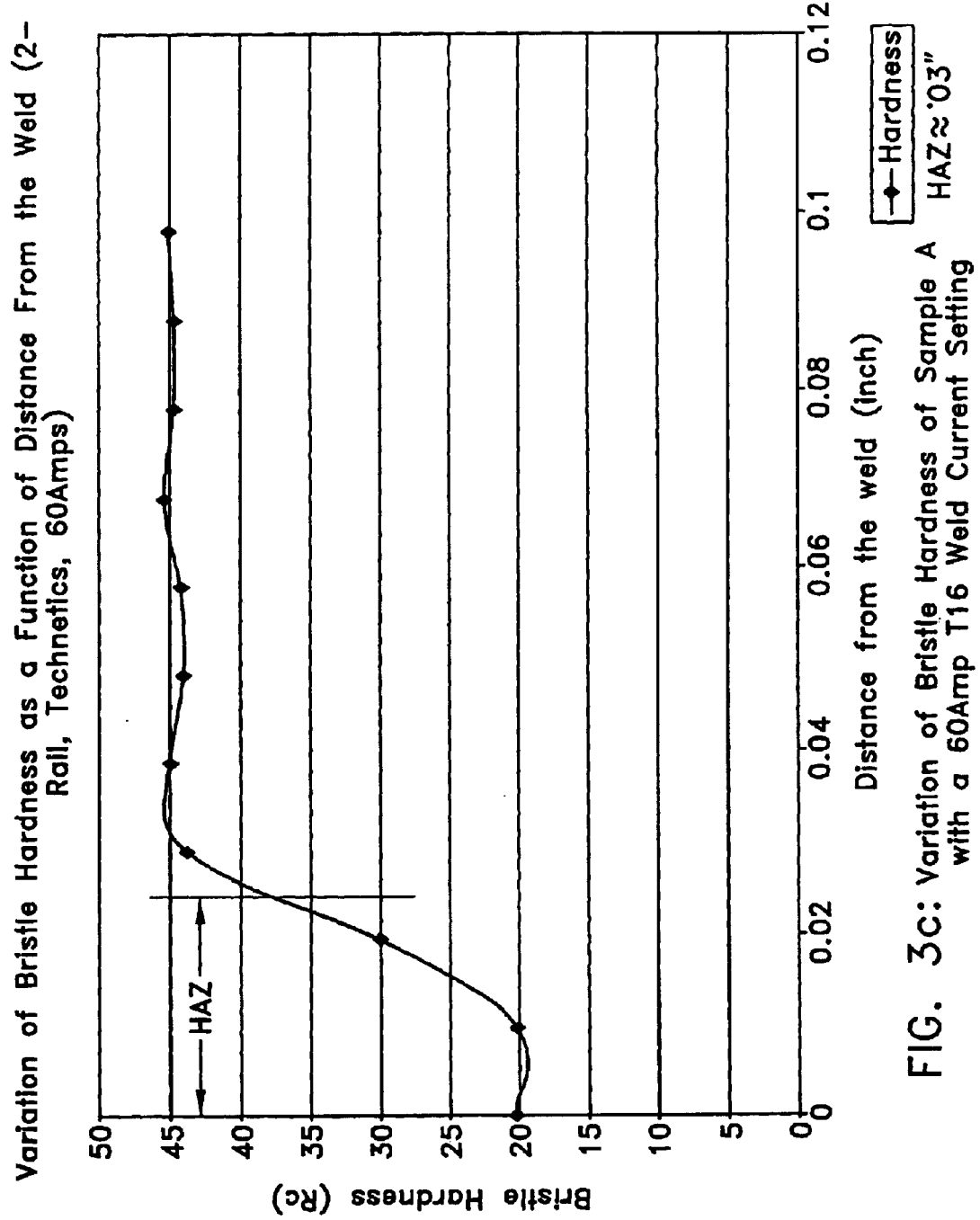
FIG. 3c: Variation of Bristle Hardness of Sample A with a 60Amp T16 Weld Current Setting

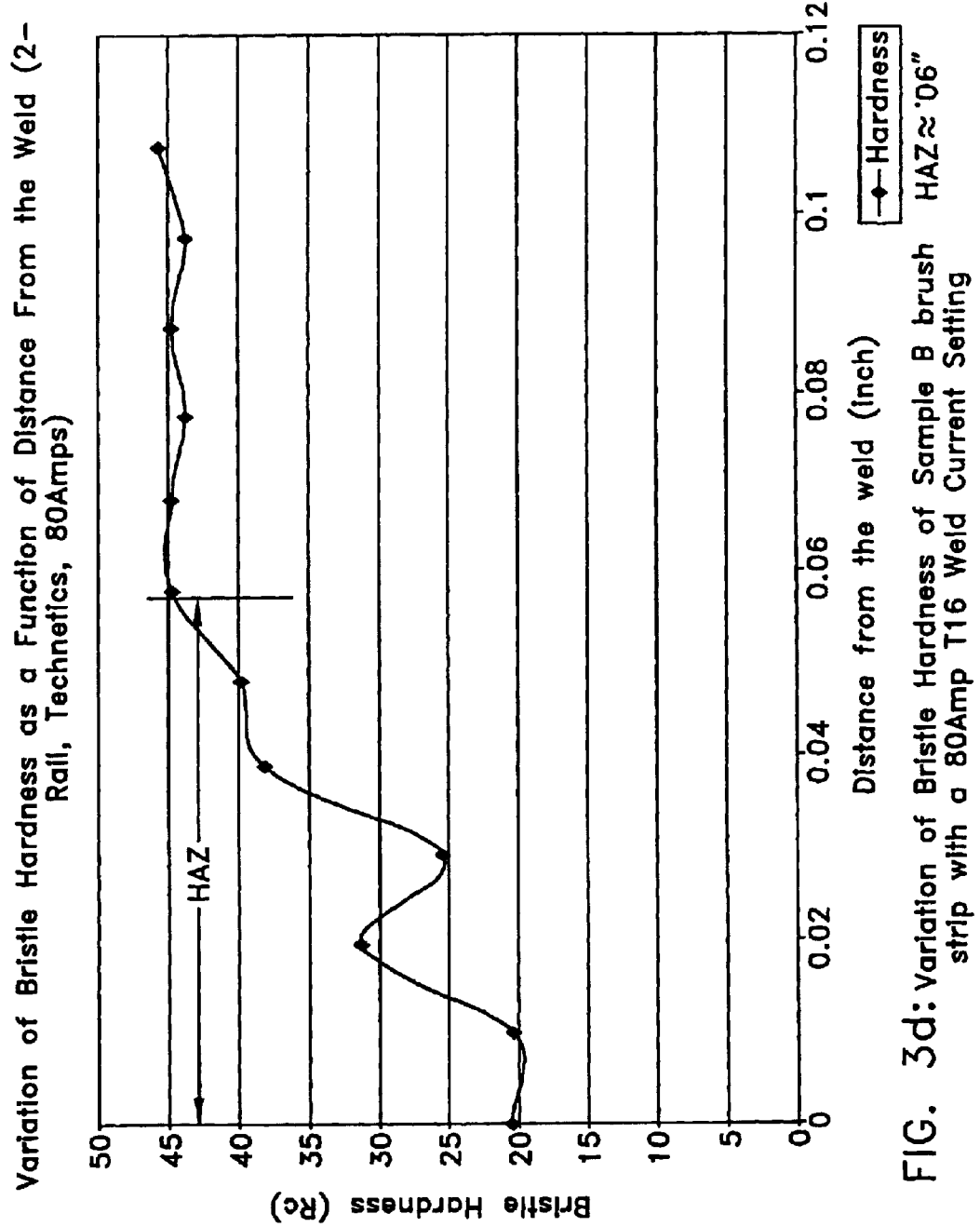
FIG. 3d: Variation of Bristle Hardness of Sample B brush strip with a 80Amp T16 Weld Current Setting

BRUSH SEAL ASSEMBLY, METHOD OF MANUFACTURE AND USE

CROSS REFERENCE TO RELATED APPLICATIONS

This application is a continuation-in-part of U.S. Ser. No. 09/638,967 filed on Aug. 15, 2000 now abandoned which claimed priority under 35 U.S.C. §119(e) to U.S. Provisional Patent Application Ser. No. 60/223,886 now abandoned, entitled BRUSH SEAL ASSEMBLY, METHOD OF MANUFACTURE AND USE, filed Aug. 9, 2000.

TECHNICAL FIELD

The invention relates generally to a brush seal assembly for sealing a gap between a high pressure area and a low pressure area, a method of manufacturing and using the brush seal assembly and, more specifically, to a brush seal assembly including a bristle strip having a plurality of bristles mounted to a flexible rail, and an annular holder, the assembly being easily manufactured and used in a variety of brush seal applications.

BACKGROUND OF RELATED ART

The use of brush seals for sealing gaps, such as those found in gas turbine engines, is known in the art. For example, in gas turbine engines brush seals are often utilized to minimize leakage of fluids at circumferential gaps, such as between a machine housing and a rotor, around a rotary shaft of the engine, and between two spaces having different fluid pressure within the engine. The fluid pressure within the system, which may be either liquid or gas, is greater than the discharge pressure (the pressure outside the area of the engine housing, toward which the fluid will tend to leak), thus creating a pressure differential in the system. As used herein, the system pressure side of the brush seal is referred to as the high pressure side, while the discharge pressure side of the brush seal is referred to as the low pressure side.

Conventional brush seals include a bristle pack which is held and guided at one end between a retaining plate and a back plate. The bristle pack is preferably flexible and includes a plurality of bristles for sealing the gap, the bristles having a free end for contacting one component, such as the rotor. While the retaining and back plate provide support for the bristle pack, they also add weight, which is not advantageous. The bristle pack is welded to the retaining plate and back plate so that the bristles do not come loose during use. Conventional designs utilize a weld pool large enough to hold the bristles to the retaining and back plates, the weld pools being critical in preventing the bristle packs from coming loose during use since they are often the only thing holding the bristle packs in place. Circular brush seals have been utilized in gas turbine engine applications to minimize leakage and increase engine fuel efficiency. Properly designed brush seals can seal up to several hundred psi of differential pressure, at surface speeds exceeding about 1000 ft/sec., and at temperatures up to about 1500 degrees F.

One style brush seal is disclosed in U.S. Pat. No. 5,066,024 to Reisinger et al. The Reisinger brush seal 1 includes a wire bundle 2 that is wound in a U-shape and bent around a core ring 8. The core ring is bent to the appropriate radius and is captured within a curved or ring-shaped tube 3 which includes a continuous slot. In its bent area, the wire bundle 2 is contacted and surrounded by the tube 3. The tube 3 is enclosed on both sides and tensioned by a pair of support rings 4 and 5 which are joined by welding at a welding joint 9 to form a housing. The joined support rings provide the required clamping force to the wire bundle 2 via the tube. In this design, the slotted tube which directly surrounds the brushes only provides for the protection of the bristles, while the required clamping force is provided solely by the joined support rings.

Another style brush seal is disclosed in U.S. Pat. No. 5,794,938 to Hofner et al. The Hofner brush seal 1 includes a plurality of stacked bristles 2 which are clamped in a U-shape around an annular core ring 3 by clamping ring 4. The clamping ring 4 is secured in an annular space U, formed between two housing portions 5a, 5b of stator 6. The legs of the bristles extend through an annular slot 7 in the clamping ring 4, towards a rotor 9. The clamping ring 4 includes a C-shaped section which clamps the bristles 2 against the core ring 3, and reverse bend portions 8a, 8b at opposite ends of the C-shaped section between which the slot 7 is formed. The C-shaped section 10 of the clamping ring 4 clamps the bristles 2 against the core ring 3 concentrically with the C-shaped section. The reverse bend portions 8a, 8b each extend into outwardly projecting radial anchor portions which form the backing elements 12a and 12b that tangentially contact the C-shaped section 10. The brush seal 1 is mounted in the stator by clamping the backing elements 12a and 12b between the housing portions 5a and 5b of the stator 6.

While generally acceptable, conventional brush seals are often expensive to produce, and are often complicated to manufacture. In addition, brush seals are subject to considerable wear and, in conventional designs, are often difficult and costly to replace.

Accordingly, there is needed in the art a brush seal which is inexpensive and easy to manufacture, and which can be readily replaced once worn.

SUMMARY

One object of the present invention is to provide a brush seal assembly which is inexpensive and easy to manufacture, and which can be readily replaced when worn.

In accordance with one aspect, there is provided a brush seal assembly comprising a bristle strip having a plurality of bristles (or bristle pack) attached to at least one rail. The assembly further includes an annular holder for supporting the rail and bristle packs mounted thereto. In a preferred embodiment, the bristle strip is flexible such that the strip can be readily bent by hand. In one embodiment, the annular holder is preferably U-shaped. The brush seal assembly may be utilized with conventional mounting techniques, and may be mounted within a unitary or segmented holder. Once installed, the brush seal assembly acts as a static and dynamic seal in order to seal the gap between a high pressure source and a low pressure source.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which:

FIG. 1 is a side view of a bristle strip including a bristle pack mounted to a flexible rail;

FIG. 2 is a cross-sectional view taken along line 2—2 of FIG. 1;

FIG. 3a is a cross-sectional view of FIG. 1 taken along line 2—2, showing the rails machined;

FIG. 3c is a graph showing the variation of bristle hardness as a function of distance from the weld pool of sample A;

FIG. 3d is a graph showing the variation of bristle hardness as a function of distance from the weld pool of sample B;

DETAILED DESCRIPTION OF THE ILLUSTRATIVE EMBODIMENTS

Figure 3B:
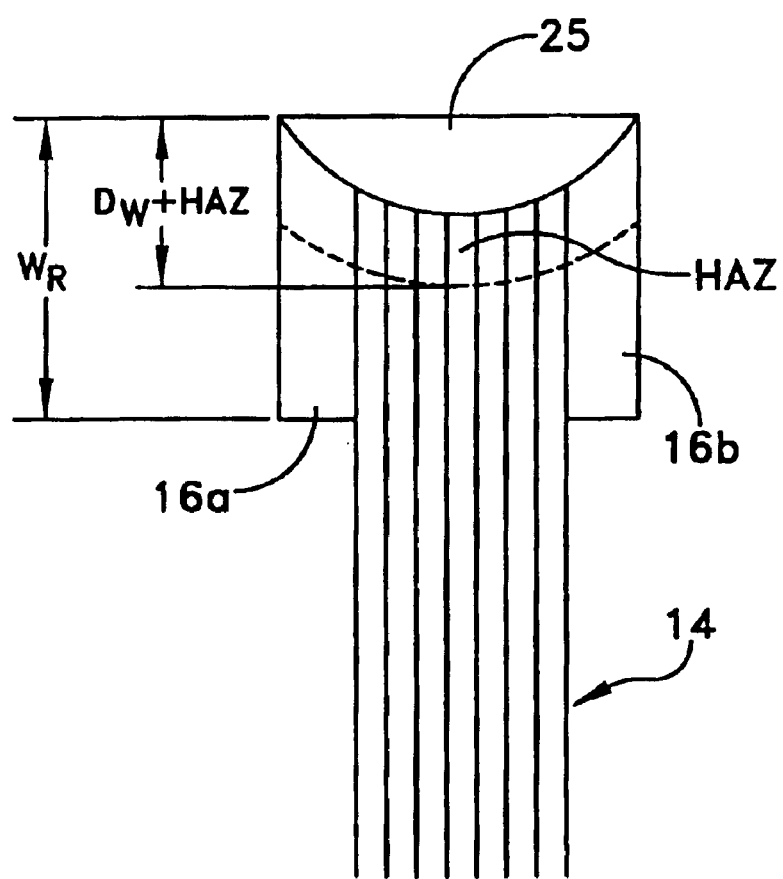
FIG. 3b is a schematic representation showing the heat affected zone (HAZ) of a representative bristle strip.

A brush seal assembly 10 for sealing a gap between a high pressure area and a low pressure area is illustrated in FIGS. 1–13. The brush seal assembly 10 preferably includes a bristle strip 12 having a plurality of bristles forming one or more bristle packs 14 which are preferably mounted at an angle (θ) to flexible rails 16a, b, and an annular holder 22 (FIG. 5) for supporting the bristle strip.

In the present embodiment, the bristle packs 14 each include a first, or fixed end 18 which are supported between the rails, and a second, or free end 20 opposite the first end. The bristle packs are preferably supported on the rails at an angle, θ (theta), of about 0–70° to the radial direction ("r"), as shown in FIG. 1. In this manner, the free ends 20 of the bristles are preferably orientated in the direction of rotation of the rotor 24 as indicated by arrow "A" (FIG. 7), or other moving component of the system. The bristle packs may preferably be held between the rails by welding, although other methods of attachment may be utilized, as would be known to those of skill in the art. In the present embodiment, the depth of the weld pool 25, ($D_W$) is preferably limited relative to the width of each rail ($W_R$), such that the rail width is preferably always greater than the depth of the weld pool. It has been observed during testing that, contrary to assumptions, increasing the weld pool depth in the present embodiment does not aid in retaining the bristle packs to the rails. Instead, increasing the weld pool depth can result in fracture of the bristles because the bristles tend to bend in the heat affected zone during use when the weld pool depth is too great. The heat affected zone (HAZ) is generally defined by the low hardness of the bristles in the region adjacent to the fusion zone (weld pool) where microstructural changes have occurred in the bristles. In other words, if the combined depth of the weld pool plus the HAZ is about equal to, or greater than, the thickness of the rails, then the bending stress on the bristles is at the weakest part of the bristles, i.e. in the heat affected zone. Most preferably, the combined depth of the weld pool plus the HAZ should be no more than about 50% of the width of the rails to avoid bristle breakage. The plurality of bristles may also be secured individually, instead of in bristle packs. In either case, the bristles are preferably made of a high temperature alloy, such as a cobalt-based superalloy (for example Haynes 25) to help maintain the shape and orientation of the bristles, and to provide wear-resistance.

After the bristle packs are secured to the rails 16a, b, the rails are preferably machined to a pre-determined width "w" with radiused corners, such that the rails (including weld pool 25) have a pre-determined outer diameter "$O_D$". The thickness ($t_1$, $t_2$) of each rail may be equal to each other, or different. Preferably, the width and thickness of the rails are such that bristle strip 12 is substantially flexible, i.e. can be bent readily by hand to fit within the annular holder. The width of the rails is preferably in the range of about 0.05–0.25 inch, and the thickness is in the range of about 0.02–0.05 inch. In the present embodiment, the width and thickness of the rails is preferably equal, and most preferably about 0.125 and 0.03 inch, respectively. The width and the thickness may be varied, depending upon the application, as would be known to those of skill in the art. However, it is preferable that the width of the rails is greater than the depth of the weld pool, while not becoming too thick so as to become stiff. Preferably, the thickness of the rails should be greater than the weld pool while allowing them to remain flexible so as to conform to the annular ring during welding. The rails may preferably be made of any suitable material, such as a nickel-base superalloy (for example Inco 625), which can withstand a high temperature environment, while remaining flexible. The rails may be formed by machining or extruding, as would also be known to those of skill in the art.

The present embodiment will be further illustrated by the following example, which is intended to be illustrative in nature and are not to be considered as limiting the scope of the disclosure.

EXAMPLE 1

Several bristle strips were fabricated with a rail depth of about 0.093" and several different power settings (60 amps and 80 amps) were used during Tungsten Inert Gas (TIG) welding. The objective was to control the combined depth of the weld pool and HAZ to within about 50% of the width of the rails.

In order to examine the integrity of the individual strips, the 0.093" rail depth and different TIG weld current settings were used for incursion test evaluation. Individual strips were bent to predetermined $O_D$, flared and their ID was machined by EDM. These strips, with the controlled weld pool and HAZ combined depths being within about 50% of the rail width exhibited no bristle fracture for incursion of up to about 0.05". However, old tufted samples with a deeper weld pool and HAZ exhibited bristle fracture. The 0.093" bristle strips were sectioned along the direction of bristle length (i.e. at 45 degrees) to measure the depths of the weld pool, HAZ and rail depth. Table II summarizes the result for the two TIG current settings:

TABLE II

DETAILS OF MODIFIED STRIP WELD GEOMETRY

|  | TIG Weld Current Setting | Rail Depth* | Weld Depth | HAZ | Combined Depth |
|---|---|---|---|---|---|
| Sample A | 60 amps | .113" | .006" | .03" | .036" |
| Sample B | 80 amps | .113" | .017" | .06" | .077" |

*Along the bristle length; the rail depth is divided box cos 45°.

Figure 4:
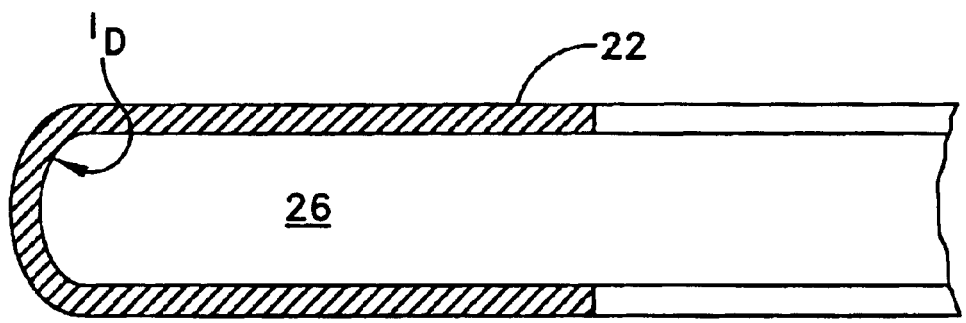
FIG. 4 is a cross-sectional view of an annular holder for mounting the bristle strip of FIG. 1.
Figure 5:
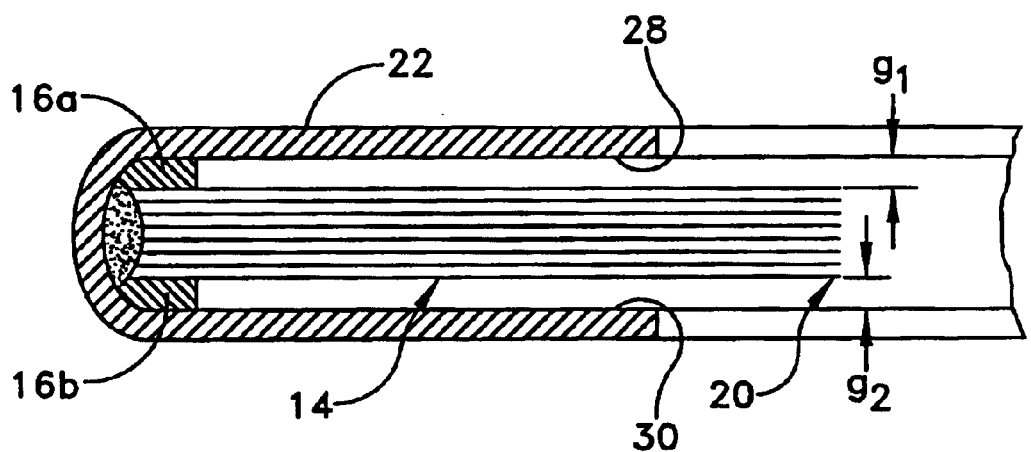
FIG. 5 is a cross-sectional view of a brush strip assembly including an annular holder with the bristle strip mounted therein.

In the present embodiment, the brush seal assembly further includes an annular holder 22, which preferably has a U-shape including an inner wall 27 defining a channel 26 having an inner diameter ($I_D$). The annular holder may be formed as a unitary member as shown in FIG. 4, and is preferably sized to receive the bristle strip therein. The rails of the bristle strip are inserted into the channel 26 of the holder so that the outer diameter of the rails are preferably in close contact with the inner diameter of the annular holder along the length thereof, and so that the free end 20 of the bristles extend from the holder (FIG. 5). The length of the bristle strip may thereafter be cut to the approximate length of the circumference of the annular holder (or, if segmented, the length of the segment of the holder). The holder may be formed by any suitable manner, such as by roll forming, and is preferably be made of any suitable material, such as a nickel-base superalloy (for example Inco 718) which can withstand a high temperature environment.

After inserting the bristle strip into the channel, a first gap ($g_1$) remains between a first side 28 of an inner wall of the holder and the adjacent bristles, and a second gap ($g_2$) remains between a second side 30 of the inner wall of the holder and the adjacent bristles. The size of the gaps are determined by the thickness of the rails, which may or may not be equal to each other, as described above. When a pressure is applied to the high pressure side, the bristle pack is pushed against the side of the holder or the back plate. By controlling the gap size, the direct contact of the bristle pack with the holder/back plate is partially retarded thereby allowing the bristles to move more freely without a hysteresis effect. In a preferred embodiment, the gap which faces the low pressure side should be about 0.040 inch or less so as to avoid direct contact of the bristle pack with the holder.

Figure 6:
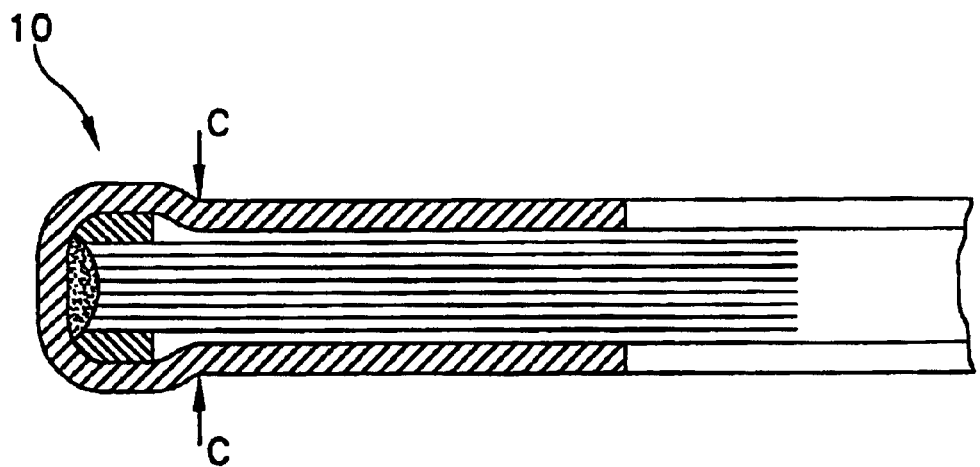
FIG. 6 is a cross-sectional view of a brush strip assembly including the annular holder with the bristle strip mounted therein after crimp rolling.
Figure 7:
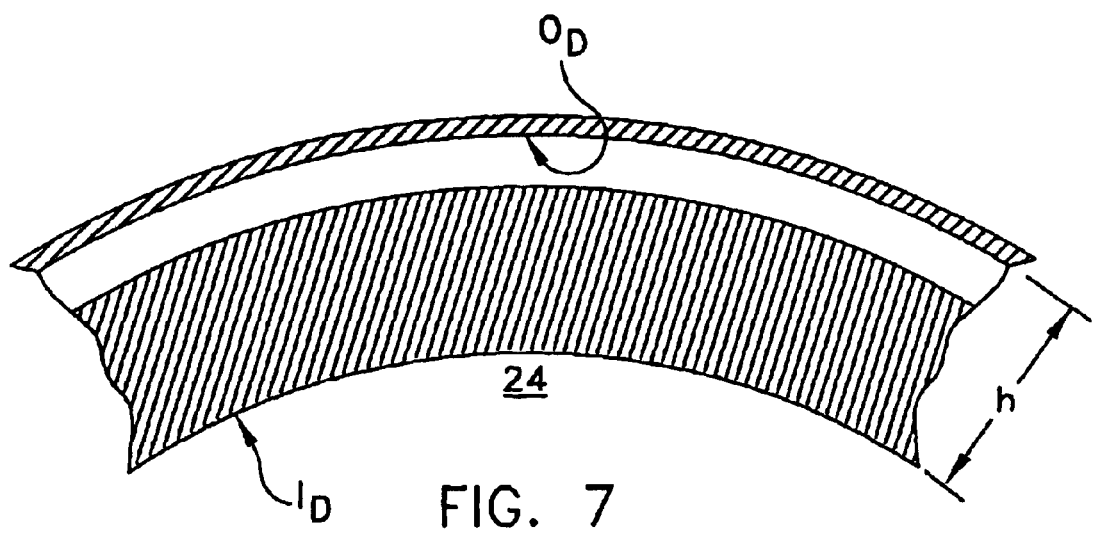
FIG. 7 is a cross-sectional side view of the brush strip assembly mounted between a rotor and stator.
Figure 8:
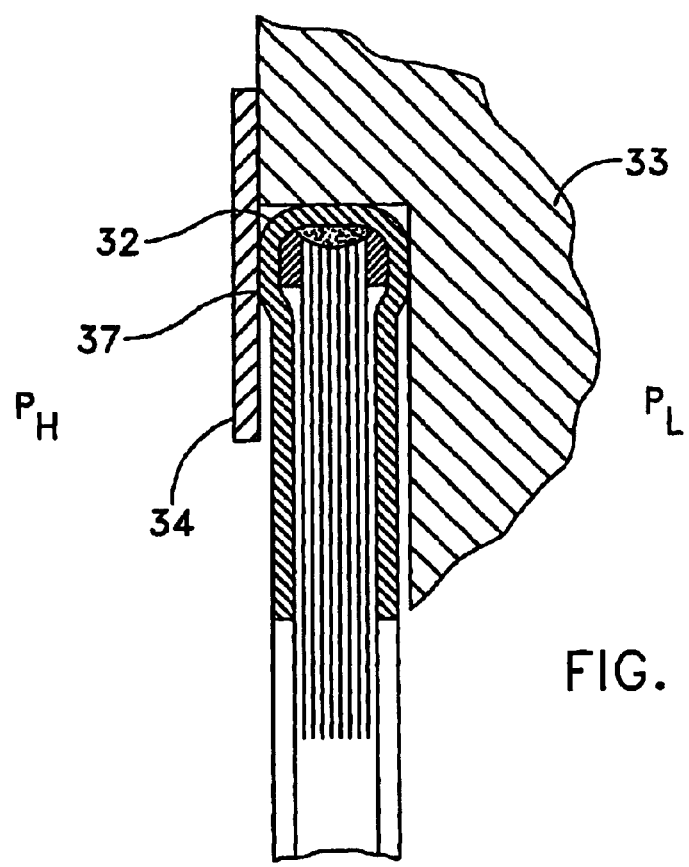
FIG. 8 is a cross-sectional view of the brush strip assembly mounted within a cavity between a holding ring and back plate.
Figure 9:
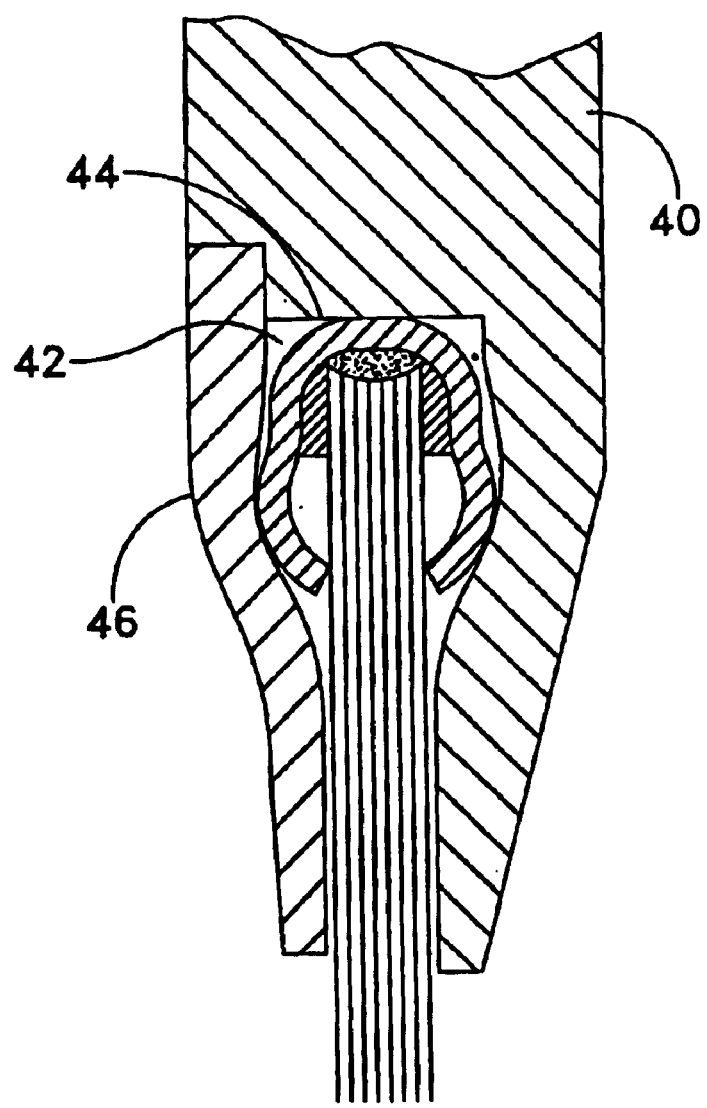
FIG. 9 is a cross-sectional view of the brush strip assembly mounted within a cavity between a holding ring and back plate of a segmented seal.

In order to secure the bristle strip within the holder 22, the holder may be compressed on either side along its length as illustrated by arrows "C", so that the rails are nested within the holder. In the present embodiment, the first and second sides 28, 30 of the of the inner wall of the holder do not contact the bristles after nesting the rails within the holder (FIG. 6). However, if desired, the ends 31a, b of the annular holder may be turned inward, toward the bristles, in order to contact the same (FIG. 9). By turning the ends of the holder inward, the outside surface of the U-ring acts as a static seal as well as pushes the strip assembly into a secured position as the front and back plates (46 and 40) are pressed together during assembly. The holder may be compressed in a variety of ways, including crimp rolling, and the rails may preferably be spot welded to the holder in order to prevent relative movement between the holder and the bristle strip, if compression does not provide adequate nesting of the rails to prevent relative movement. Alternatively, other methods of attaching the bristle strip within the annular holder which prevents relative movement there between may be utilized, as would be known to one of skill in the art. Once the bristle strip is secured within the annular holder, the inner diameter ($I_D$) of the bristles are then machined, such as by electro-discharge machining, so that the bristles have a constant height ("h") along the length of the bristles, the height being measured from the $O_D$ of the annular holder to the $I_D$ of the bristles.

After the bristle strip is secured within the annular holder and machined, the brush seal assembly is then installed within a cavity or slot 32 in housing 33. The brush seal assembly may preferably be secured within the slot 32 by a holding ring 34, which may be of a conventional design as would be known to those of skill in the art. For example, in aerospace applications the holding ring may include both a front plate and a back plate for supporting the brush seal assembly there between. In such aerospace applications, the housing may have a diameter of up to about 36 inches, as is conventional. In use, the brush seal assembly is mounted such that a first side of the assembly faces a high pressure source ($P_H$), whereas a second side faces a lower pressure source ($P_L$), FIG. 8. The annular holder provides a sealing interface 37 between the holding ring 34 and the slot 32, while the bristles provide sealing between the moving surface (rotor), the stationary housing, and the low and high pressure sources. In this manner, the brush seal assembly acts as a static and dynamic seal in order to seal the gap between the high pressure source and the low pressure source.

Figure 14:
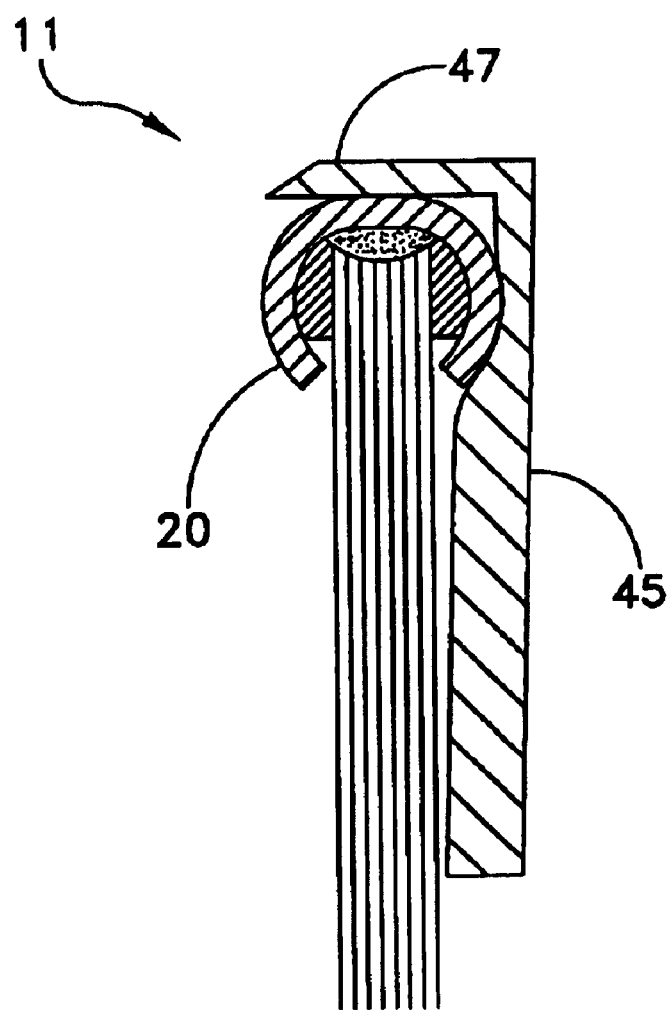
FIG. 14 is a cross-sectional view of another embodiment of a low-profile brush strip assembly mounted within an "L" shaped mounting ring.

Referring now to FIG. 14, a low-profile brush seal particularly suited for aerospace applications can also be fabricated by attaching the U-ring/bristle strip assembly to an L-shaped ring 45 which acts as the back plate on the low pressure side. In this embodiment, the annular holder 22 may be shortened and tack welded, or otherwise attached, to a top portion 47 of the L-ring 45. By utilizing the L-shaped ring, the heavier back plate 40 can be eliminated, without sacrificing support of the brush seal. In aerospace applications it can be particularly important to reduce weight without sacrificing other features, such as support. The L-shaped ring of FIG. 14 accomplishes both these objectives in a simple, easy to manufacture manner.

When utilized in land based applications, such as for power generation, the brush seal may preferably be segmented and may be supported within a segmented housing ring 40. As shown in FIG. 9, the segmented ring 40 is machined in order to form a slot 42 for receipt of the brush seal assembly therein, and preferably includes a stepped portion 44 for supporting a face ring 46. The brush seal assembly is preferably sandwiched between the face ring and the segmented ring, in order to hold the brush seal assembly within the segmented housing ring. For such segmented seals, the inner diameter ($I_D$) of the bristles can be machined after installing the brush seal assembly within the segmented ring.

Figure 10:
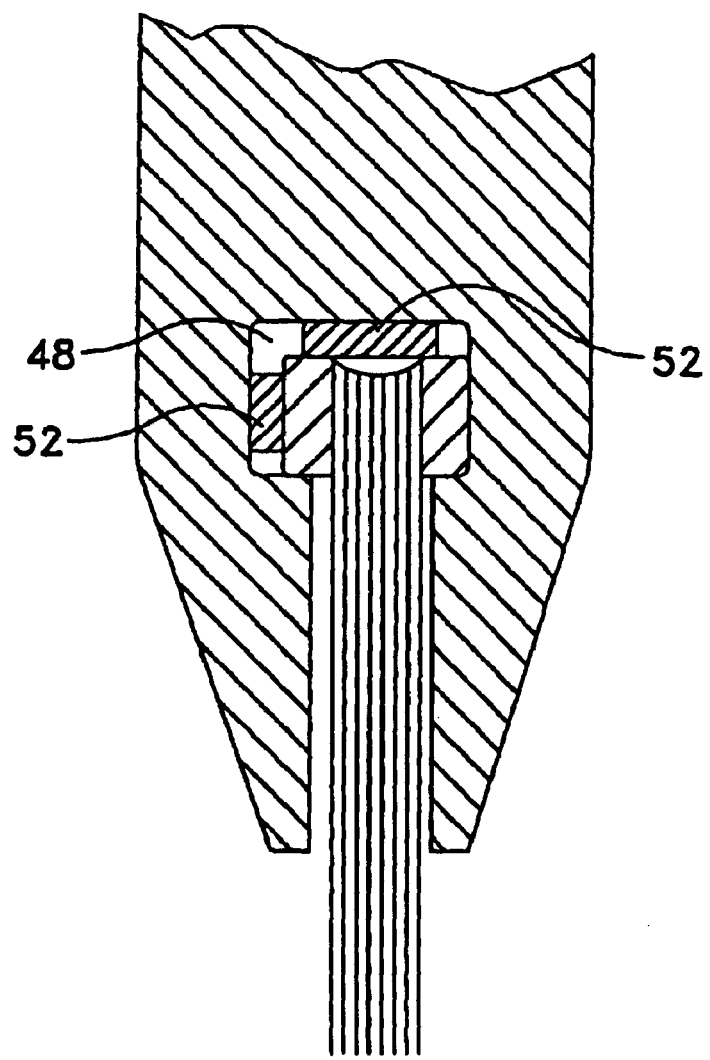
FIG. 10 is a cross-sectional view of the brush strip assembly mounted within a machined slot in a segmented seal.
Figure 11:
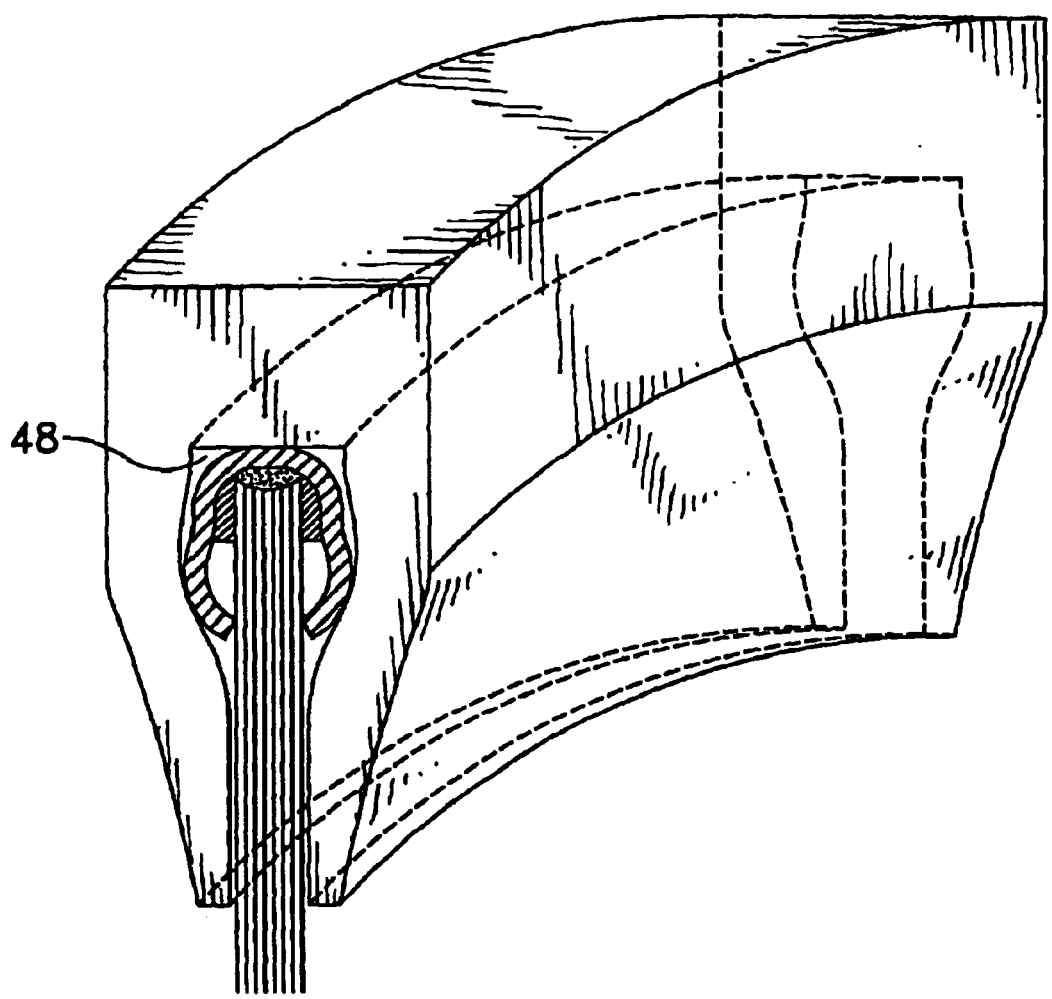
FIG. 11 is a partial cross-sectional view of the brush seal assembly mounted within a unitary housing having a machined key hole.

The flexible brush seal assembly can also be directly installed into a slot or channel 48 which may be machined or cast into a unitary (i.e. one piece) housing 50 for the segmented brush seal as shown in FIGS. 10 and 11. After forming channel 48 running along the length of the housing, the brush seal assembly is preferably inserted into the channel at one end, is positioned within the length of the channel, and secured into the channel, such as by tack welding at the two ends of the housing. When utilizing a unitary housing, the inner diameter ($I_D$) of the bristles may also be machined after installing the brush seal assembly within the unitary housing. In the present embodiment, the channel is preferably tapered (FIG. 11) such that the outer diameter of the assembly fits snuggly against the inner surface of the slot. In order to insert the brush seal assembly within the tapered slot, the rails may need to be compressed which results in the U-shaped holder acting as a spring to hold the brush seal assembly within the slot. Alternatively, the channel may be T-shaped (FIG. 10), and the brush seal assembly may be positioned and retained within the slot by shims 52 which may be either flat or shaped.

Figure 12:
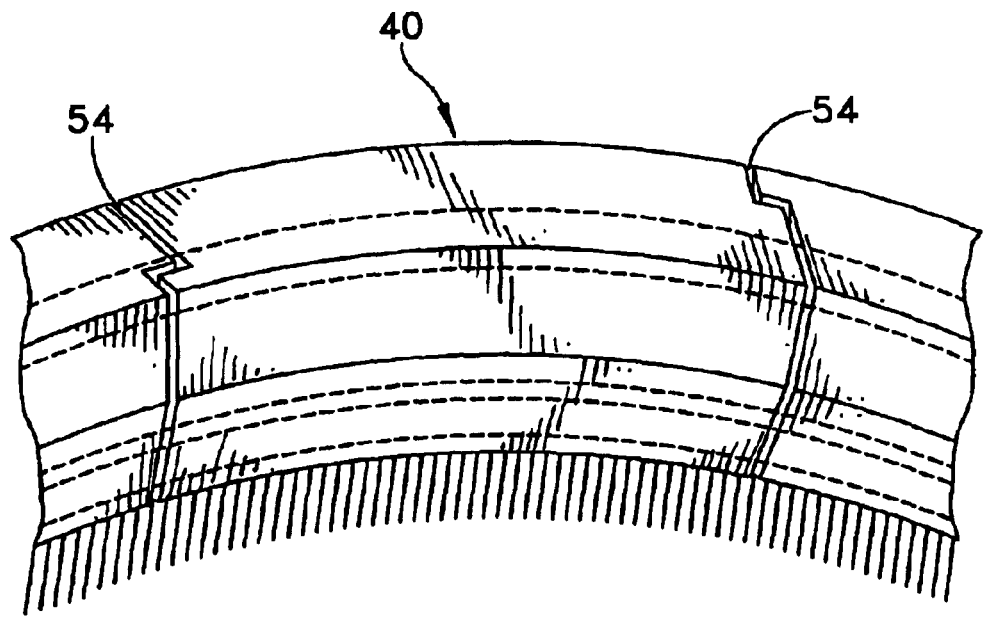
FIG. 12 is a side view of a joint design for a segmented brush seal with the brush assembly mounted therein.
Figure 13:
FIG. 13 is a schematic view of the joint design of FIG. 12.

In order to minimize leakage of the brush seal assembly, the ends 54 of the segmented housing may preferably be stepped, staggered, and cut at substantially the same angle as the bristles, as shown in FIG. 12. By forming the ends of the segmented housing in this manner, when the segments are joined, there is no direct leak path between the lower pressure source and the higher pressure source. Alternatively, the ends of the segmented housing may be substantially straight, as known in the art.

Figure 15:
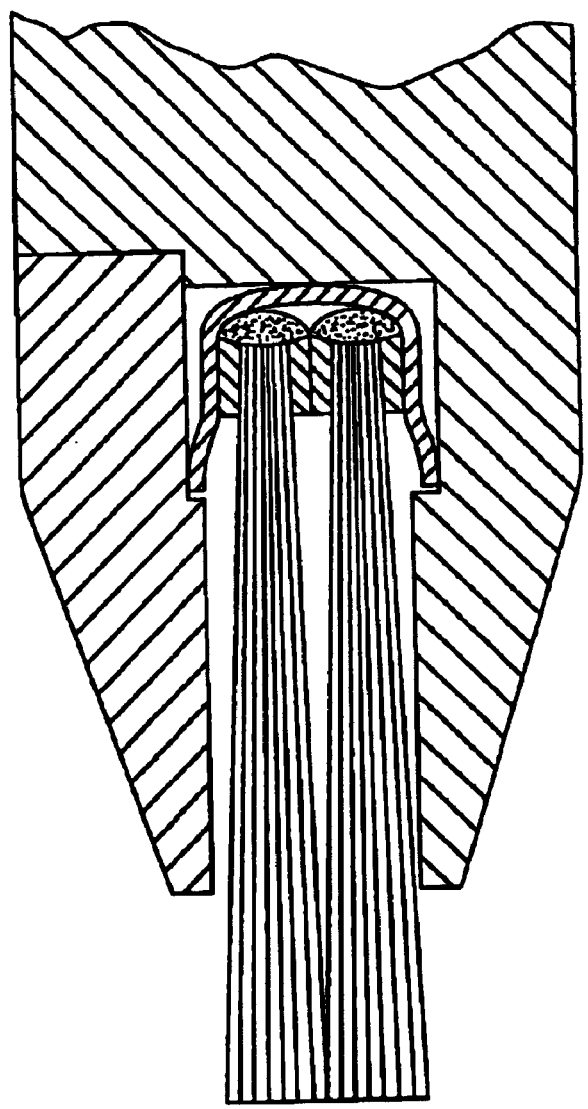
FIG. 15 is a cross-sectional view of dual brush strip assembly including a pair of identical bristle strips mounted within a housing.
Figure 16:
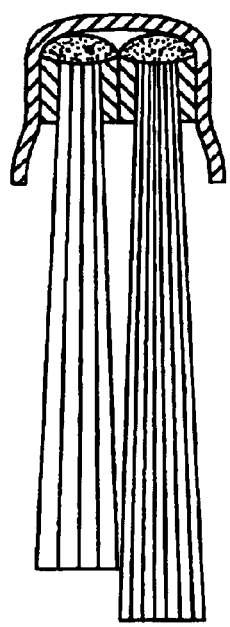
FIG. 16 is a cross-sectional view of a dual brush strip assembly including a pair of non-identical bristle strips mounted within a housing.
Figure 17:
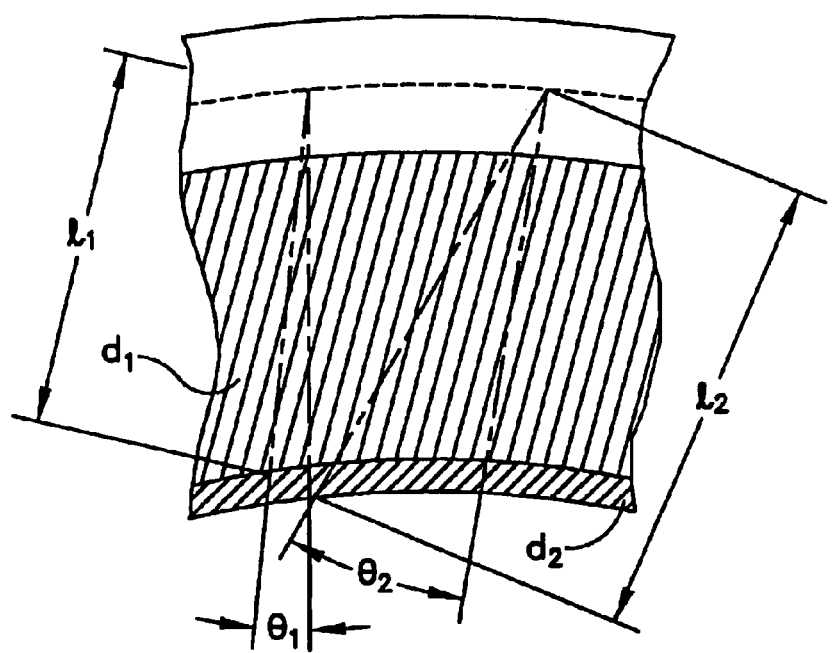
FIG. 17 is an enlarged, side view of the dual brush strip assembly of FIG. 16.

Referring now to FIGS. 15–17, multiple bristle strips may be mounted within a single, holder 22. In the present embodiments, dual bristle strips are mounted within a single holder, such that inner rails 22a of the bristle strips are in contact with each other, and outer rails 22b of the bristle strips contact the holder. In the embodiment of FIG. 15, the bristle strips 12a are substantially identical, i.e. the bristle lengths, bristle angles, bristle diameters, and bristle densities are substantially the same for both sets of bristle strips. In contrast, the bristle strips of FIGS. 16 and 17 are non-identical, i.e. the bristle lengths, bristle angles, bristle diameters, and/or bristle densities may be varied for each set of bristle strips. Some or all of the bristles characteristics may be different, for example only the length may be varied, or the length and the angle may be varied, as desired. A variety of reasons may exist for utilizing multiple bristle strips, for example in order to provide a damper on the upstream side or for extremely high pressure applications. Likewise, a variety of reasons may exist for varying the characteristics between the dual bristle strips. In one embodiment, the rows of the front bristle strip may be made of thicker bristles, or the bristle angles may be varied, depending upon the application.

Use of the brush seal assembly will now be described with continued reference to FIGS. 1–17.

As described above, the bristle strip is formed by securing the first end 18 of the bristle pack 14 at an angle between rails 16a, b. The rails may then be machined to a pre-determined width "w" with radiused corners, so that the rails have a pre-determined outer diameter "$O_D$". The rails of the bristle strip are then inserted within channel 26 of the annular holder so that the outer diameter of the rails are in close contact with the inner diameter of the annular holder along the length thereof, and so that the free ends of the bristles extend from the holder. The length of the bristle strip may thereafter be cut to the approximate length of the circumference of the annular holder (or, if segmented, the length of the segment of the holder). The holder may then be compressed on either side along its length, so that the rails are nested within the holder. The inner diameter ($I_D$) of the bristles are thereafter preferably machined so that the bristles have a constant height ("h") along the length of the bristles, the height being measured from the $O_D$ of the annular holder to the $I_D$ of the bristles. After the bristle strip is secured within the annular holder and machined, the brush seal assembly is then installed within a cavity or slot in a housing which may be either segmented or non-segmented. The brush seal assembly is mounted such that a first side of the assembly faces a high pressure source ($P_H$), whereas a second side faces a lower pressure source ($P_L$). The annular ring of the present embodiment provides a sealing interface within the housing cavity or slot, while the bristles provide sealing between the moving surface, the stationary housing and the low and high pressure sources.

Thus, it can be seen that the present invention provides a brush seal assembly which is inexpensive and easy to manufacture, and which can be readily replaced when worn. The provision of an annular holder allows the brush seal assembly to be readily removed and replaced, and also allows the bristle strip to be replaced while the housing may be reused. By securing and machining the bristles as described above, the size of the brush seal assembly is also very accurate so as to provide optimal sealing between components.

It will be understood that various modifications may be made to the embodiment disclosed herein. Although the annular holder is shown and described as U-shaped, it should be understood that the annular holder may take other configurations. For example, the holder may have an L-shaped configuration, with the bristle strip being secured to the holder such as by tack welding. In addition, the rails may be constructed as separate pieces, or as a single, unitary piece if desired. Likewise, the annular holder may be unitary, or formed from multiples pieces. Also, the brush seal assembly may be used for a variety of sealing applications other than those specifically disclosed herein. Therefore, the above description should not be construed as limiting, but merely as exemplifications of a preferred embodiment. Those skilled in the art will envision other modifications within the scope, spirit and intent of the invention.

What is claimed is:

1. A brush seal assembly for sealing a gap between a high pressure area and a low pressure area comprising:

at least one bristle strip including a bristle pack having a first end welded to at least one flexible, mounting rail by a weld pool having a depth and including a heat affected zone, the at least one flexible rail having a width greater than the combined depth of the weld pool and heat affected zone, and the bristle strip further including a free second end opposite the first end defining an inner diameter;

at least one annular holder, the annular holder having an inner wall defining a channel, the channel having an inner diameter sized to receive the bristle strip therein and further including a first side and a second side, each of the first and second sides spaced from the bristle pack so as to form a gap between the bristle pack and each of the first and second sides; and wherein upon insertion of the at least one bristle strip within the at least one annular holder, the bristle pack is spaced from the at least one annular holder, such that the at least one annular holder is out of direct contact with the bristle pack.

2. The brush seal assembly of claim 1, wherein the bristle pack is supported at an angle of about 0 to 70 degrees to the at least one mounting rail.

3. The brush seal assembly of claim 1, wherein the an outer diameter of the at least one mounting rail is disposed in contact with the inner wall of the channel along a length thereof.

4. The brush seal assembly of claim 1, wherein the at least one mounting rail comprises a first and a second mounting rail, each mounting rail having a predetermined width greater than the combined depth of the weld pool and heat affected zone, and being substantially flexible so as to be bendable by hand in order to allow the at least one bristle strip to be fitted and supported within the at least one annular holder.

5. The brush seal assembly of claim 1, in combination with a housing constructed and arranged to support the at least one annular holder, wherein the at least one bristle strip and at least one annular holder are supported within the housing such that the second end of the at least one bristle strip is spaced from the housing in an at rest position.

6. The brush seal assembly of claim 5, wherein the first and second mounting rails are formed as a unitary member.

7. The brush seal assembly of claim 1, wherein the at least one annular holder is generally U-shaped.

8. The brush seal assembly of claim 1, wherein the at least one annular holder includes a crimped portion for securing the brush strip within the at least one annular holder.

9. The brush seal assembly of claim 1, wherein the combined depth of the weld pool and heat affected zone is less than about 50% of the width of the at least one mounting rail.

10. The brush seal assembly of claim 1, in combination with an L-shaped ring constructed and arranged to support the brush seal assembly, and disposed on a low pressure side of the brush seal assembly during use so as to act as a back plate for the assembly.

11. The brush seal assembly of claim 1, in combination with a housing having a slot sized to receive the brush seal assembly therein.

12. The brush seal assembly of claim 11, wherein the housing is segmented and includes first and second ends having a stepped and staggered configuration so that a leak path between the lower and the higher pressure sources is indirect.

13. The brush seal assembly of claim 1, wherein the at least one brush strip comprises two or more brush strips.

14. The brush seal assembly of claim 13, wherein the two or more brush strips are supported within a single annular holder.

15. The brush seal assembly of claim 13, wherein the two or more brush strips are substantially identical.

16. The brush seal assembly of claim 13, wherein the two or more brush strips are non-identical.

17. The brush seal assembly of claim 13, wherein each of the two or more brush strips includes an inner rail and an outer rail, the inner rails of each of the two or more bristle strips being disposed in contact with each other, and the outer rails of each of the bristle strips being disposed in contact with the holder.

18. A method of forming a brush seal assembly for sealing a gap between a high pressure area and a low pressure area, comprising the steps of:

securing a first end of a plurality of bristles at an angle to at least one flexible mounting rail so as to form a bristle strip;

providing an annular holder including a first side and a second side, the first and second sides being substantially parallel to each other;

inserting the at least one mounting rail within a channel of the annular holder so that an outer diameter of the mounting rails is adjacent an inner diameter of the holder and such that the first and second sides of the annular holder are spaced from the bristles so as to form a gap between the bristles and each of the first and second sides in an at rest position;

cutting the length of the bristle strip to the approximate length of the circumference of the annular holder;

securing the bristle strip within the annular holder; and machining an inner diameter of the plurality of bristles to a predetermined height.

19. The method of claim 18, further comprising the step of inserting the bristle strip and annular holder within a housing.

20. The method of claim 18, further comprising the step of machining the at least one mounting rail to a predetermined width with radiused corners.

21. The method of claim 18, wherein the plurality of bristles are secured to the at least one mounting rail by a weld pool having a depth and including a heat affected zone, the combined depth of the weld pool and heat affected zone being less than the width of the at least one mounting rail.

22. The method of claim 21, wherein the combined depth of the weld pool and heat affected zone is less than about 50% of the width of the at least one mounting rail.

23. The method of claim 18, wherein the bristle strip is secured within the annular holder by crimping a portion of the annular holder so that the bristle strip rests therein and such that relative movement between the annular holder and the bristle strip is minimized.

24. A brush seal, assembly for sealing a gap between a high pressure area and a low pressure area comprising:

at least one bristle strip including a bristle pack having a first end supported by at least one flexible rail, and the bristle strip further including a free second end opposite the first end;

at least one annular holder, the annular holder having an inner wall defining an arcuate channel, the channel having an inner diameter sized to receive the bristle strip therein and further including a first side and a second side, each of the first and second sides spaced from the first end of the bristle pack so as to form a gap between the first end of the bristle pack and each of the first and second sides;

a housing including a channel configured and dimensioned to support the at least one annular holder; and wherein upon insertion of the at least one bristle strip within the at least one annular holder, the flexible rail contacts an inner wall of the annular holder, and the bristle pack is spaced from the at least one annular holder, such that the at least one annular holder is out of direct contact with the bristle pack so that upon operation the bristles are unconstrained and are able to move into the gap.

25. The brush seal assembly of claim 24, wherein the housing comprises a segmented housing having:

a first end and a second end having a stepped configuration, the first and second ends being staggered with respect so each other;

wherein a leak path between the lower and the higher pressure areas is indirect through the housing.

* * * * *

UNITED STATES PATENT AND TRADEMARK OFFICE
CERTIFICATE OF CORRECTION

PATENT NO. : 6,913,265 B2
DATED : July 5, 2005
INVENTOR(S) : Amitava Datta

It is certified that error appears in the above-identified patent and that said Letters Patent is hereby corrected as shown below:

Column 10,
Line 25, claim 22 should read as follows:
-- The method of claim 18, wherein the bristle strip is secured within the annular holder by crimping a portion of the annular holder so that the bristle strip rests therein and such that relative movement between the annular holder and the bristle strip is minimized. --.
Line 28, claim 23, should read as follows:
-- The method of claim 21, wherein the combined depth of the weld pool and heat affected zone is less than about 50% of the width of the at least one mounting rail. --.
Line 33, claim 24 should read as follows:
-- The brush seal assembly of claim 25, wherein the housing comprises a segmented housing having:
    a first end and a second end having a stepped configuration, the first and second ends being staggered with respect so each other;
    wherein a leak path between the lower and the higher pressure areas is indirect through the housing. --.
Line 58, claim 25 should read as follows:
-- A brush seal, assembly for sealing a gap between a high pressure area and a low pressure area comprising:
    at least one bristle strip including a bristle pack having a first end supported by at least one flexible rail, and the bristle strip further including a free second end opposite the first end;
    at least one annular holder, the annular holder having an inner wall defining an arctuate channel, the channel having an inner diameter sized to receive the bristle strip therein and further including a first side and a second side, each of the first and second sides spaced from the first end of the bristle pack so as to form a gap between the first end of the bristle pack and each of the first and second sides;

UNITED STATES PATENT AND TRADEMARK OFFICE
CERTIFICATE OF CORRECTION

PATENT NO. : 6,913,265 B2
DATED : July 5, 2005
INVENTOR(S) : Amitava Datta

It is certified that error appears in the above-identified patent and that said Letters Patent is hereby corrected as shown below:

Column 10 (cont.),
    a housing including a channel configured and dimensioned to support the at least one annular holder; and
    wherein upon insertion of the at least one bristle strip within the at least one annular holder, the flexible rail contacts an inner wall of the annular holder and the bristle pack is spaced from the at least one annular holder, such that the at least one annular holder is out of direct contact with the bristle pack so that upon operation the bristles are unconstrained and are able to move into the gap. --.

Signed and Sealed this

Eleventh Day of October, 2005

JON W. DUDAS
*Director of the United States Patent and Trademark Office*